June 16, 1942.  J. A. GILMARTIN  2,286,269
EYE SHADE
Filed Jan. 22, 1941
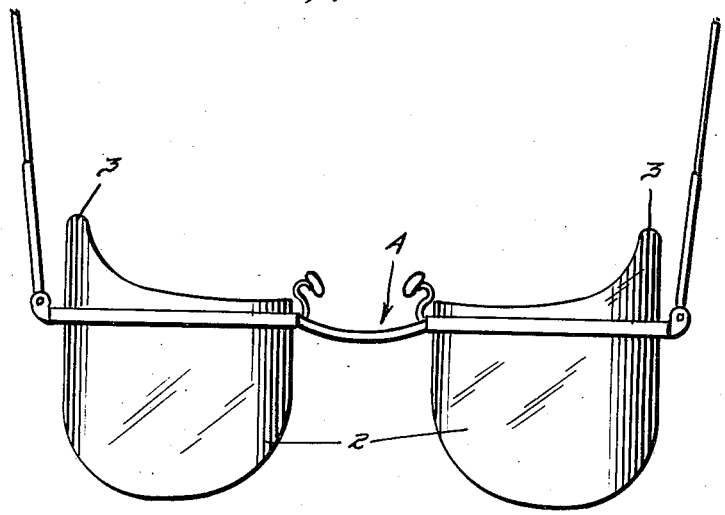
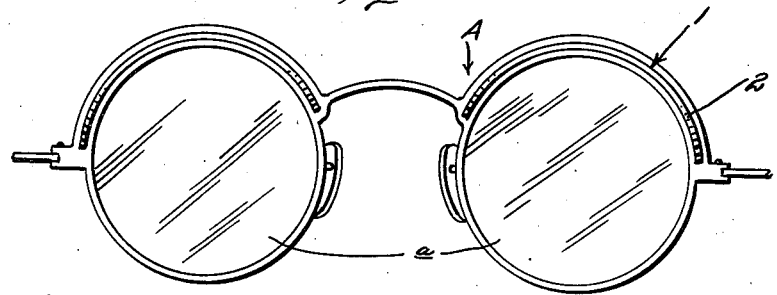
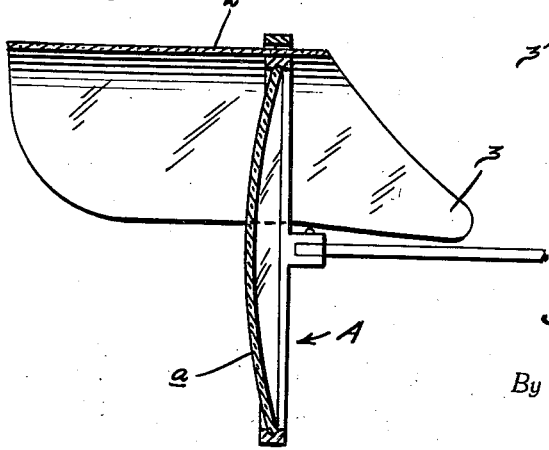
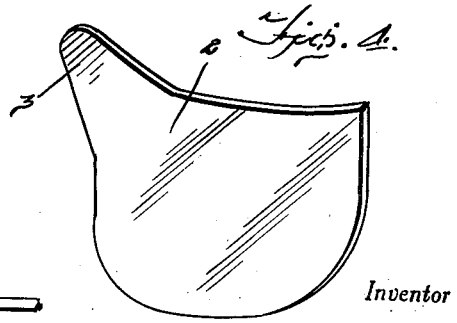
Inventor
James A. Gilmartin
By Clarence A. O'Brien
Attorney Patented June 16, 1942

2,286,269

UNITED STATES PATENT OFFICE 2,286,269

EYESHADE

James A. Gilmartin, Scranton, Pa.

Application January 22, 1941, Serial No. 375,490

1 Claim. (Cl. 2—12)

This invention relates to an eye shade, the general object of the invention being to provide means whereby the shades are carried by eyeglass frames or frames made similar to eyeglass frames, with the shade forming members held in arcuate shape.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a top plan view of the invention.

Figure 2 is a front view thereof.

Figure 3 is a vertical sectional view.

Figure 4 is a view of one of the shade members before it is placed in the frame.

In these views the letter A indicates the frame which is made in the form of an eyeglass frame and may be used for holding the lens $a$ in place thought it is to be understood that this frame may be used without the lens and may have the lower portion omitted. A substantially semicircular slot 1 is formed in the upper portion of each lens carrying member and the shade members 2 are passed through the slots so that the shade members are held in substantially semicircular form above the eyes of the user. These shade members may be formed of any suitable material and of any suitable color though, of course, they must be flexible enough to be bent from a flat condition to a substantially semicircular one so that they can be passed through the slots. The members are of considerable length so that they will thoroughly protect the eyes from the sun and bright lights and the rear end of each member is formed with a reduced extension 3 at the outer side thereof which will fit over the outer corner of the eye and engages the temple so that no light will pass through the rear end of the device to hit the eye.

The shade member should be of a length that it can readily be placed in the case of the eyeglasses and if desired the inner edge of each member 2 can be rounded so as to have a comfortable fit.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

An eye shade of the class described comprising a spectacle frame with the upper portions of the eye members having arcuate slots therein extending from the front faces of the eye members through the rear faces thereof and translucent shade members of flexible material passing through the slots with portions extending forwardly beyond the eye members and other portions extending rearwardly to engage the forehead of a user, each shade member having a rear extension at its outer side to engage the temple of the user and each shade member being normaly flat and of a size to be placed in a case of a spectacle frame.

JAMES A. GILMARTIN.